No. 752,487. Patented February 16, 1904.

UNITED STATES PATENT OFFICE.

LEONARD SCHADE VAN WESTRUM, OF BERLIN, GERMANY.

METHOD OF SPRINKLING STREETS.

SPECIFICATION forming part of Letters Patent No. 752,487, dated February 16, 1904.

Application filed December 10, 1903. Serial No. 184,674. (No specimens.)

*To all whom it may concern:*

Be it known that I, LEONARD SCHADE VAN WESTRUM, a subject of the Queen of the Netherlands, residing at Berlin, Germany, have invented certain new and useful Improvements in Methods of Sprinkling Streets; and I do declare the following to be a full, clear, and exact description of the invention, such as will enable others skilled in the art to which it appertains to make and use the same.

My invention relates to an improved method of sprinkling streets, and is an improvement on subject-matter set forth and described in an application filed by me in the United States Patent Office on April 4, 1903, Serial No. 151,183.

The ordinary system of sprinkling streets with water for the purpose of laying the dust has the disadvantage that in hot weather the water very rapidly evaporates, so that the sprinkling operation must be frequently repeated, whereby a very large quantity of water is used.

Attempts have been made to employ crude petroleum instead of water, as the former evaporates much slower than water, and therefore renders such frequent sprinkling unnecessary. One of the great disadvantages of petroleum, however, is that it possesses a disagreeable odor, and, further, should it get upon the clothing of passers-by greasy spots are formed which are extremely difficult to remove.

According to my invention I make use of the fact that oily substances evaporate very slowly, but at the same time I avoid the inconvenience above referred to.

My invention consists of a new and improved method of utilizing the granulated dust or particles evolved from the surface of streets and road-beds by the constant wear and tear caused by travel of animals, vehicles, and the action of the elements, first, by saturating the said granulated particles with a mixture of oily substance, permeating them through and through, causing the same to become intimately mixed with said oily substance, which is preferably composed of oil and water in such proportions as will be hereinafter described; secondly, in sprinkling road-beds, streets, and the like with an oily substance in such manner that the dust particles become united with a homogeneous mass, binding the particles together to form a coating or top dressing for the road-bed or street, causing said dust to adhere to the solid surface of said bed or street, and thus preventing the diffusion of the said dust by the wind, to the discomforture and annoyance of pedestrians and to the injury to houses and articles generally.

It further consists in other improvements which will be hereinafter more fully described, and pointed out in the appended claims.

For the purpose of my invention in using a soluble sprinkling liquid I employ oily substances, such as petroleum, petroleum residue, or other suitable mineral or tar oils rendered soluble in water by any known process, these compounds being previously prepared so as to readily mix in solution with a larger volume of water. The proportion I prefer is about from ten to twenty parts of prepared oil to eighty or ninety parts of water, according to the depth of dust or sand to be laid, saturated and unified, so that a substantial coating will be formed on the surface of the road-bed or street, whereby the surfaces of said streets or road-beds are greatly benefited and preserved and the diffusion and scattering of dust largely prevented. This sprinkling medium has the advantage that by reason of the addition of oily substances it evaporates considerably less rapidly than pure water, while owing to the oily substances being dissolved in the water it does not leave spots on the clothing of persons which are difficult to remove. Spots made on wearing apparel by this new sprinkling liquid can be readily removed by the application of plain water. Furthermore, I can apply my sprinkling medium at an ordinary temperature and without pressure by using the common watering-car or the like, which is not possible by using for the same purpose crude petroleum or tar, as the latter must be applied on road-beds in a hot condition and by using pressure, because cold mineral oils or tar do not get mixed with sand, dust, and the like, but form with it globules, which are mutually repulsed and do not form at all a binding medium for dry or moist sand, dust, and the like. Rain does not impair the road-beds at all after having been treated by my method, as the rain-water is absorbed at once by the oil on the road-bed, out of which the former water has been more or less evaporated, so that rain, in fact, revives the binding effect on the dust particles and largely serves the purpose of a fresh sprinkling of the solution. Besides, the said soluble oily substance can be dissolved in water to any desired extent, and as but a small quantity of same is needed my improved method is very cheap and economical. Finally, my improved sprinkling medium diffuses much easier than petroleum in the road-surfaces covered with dust particles and binds permanently the stones, sand, dust, and earthy material or the like forming the road-bed.

It will be evident that piles of dust, sand, coal, and other comminuted particles capable of being blown off may be treated with the sprinkling solution, which forms a crust on the surface of the heap or pile, and thus prevents their scattering.

Having thus described my invention, what I claim is—

1. The method of utilizing the granulated portions of road-beds or streets by forming them into a top dressing or coating, by first mechanically or chemically mixing in predetermined proportions oil and water, then sprinkling or spreading the said mixture over the said loose granulated substance or dust and permeating the same, thereby unifying them and forming a concrete mass which adheres to the solid surface of the street or road-bed, thus preventing the diffusion of dust and forming the said top dressing.

2. The method herein described of first taking say ten parts of oil, then ninety parts of water, then mixing the same in a solution, then distributing the mixture over a surface of granulated substance by which the granules are united in a thin stratum, whereby their diffusion or scattering is prevented.

3. The method herein described of improving the surface of road-beds and utilizing the loose granulated particles thereon, by sprinkling or coating them with a mixture of oily substances composed of predetermined proportions of oil and water, whereby the said substances are caked or mixed to form a coating for the purpose specified.

4. The method of utilizing the granulated portions of road-beds or streets known as dust and forming it into a top dressing by permeating it with an oily substance consisting of oil and water previously and intimately mixed, whereby the said granulated particles are unified with oil and water and form a concrete mass in the manner and for the purposes specified.

5. The method herein described of saturating scattered dust and mixing the same with a mixture of oil and water in the proportions specified in such a manner that said dust is made to adhere to its bed, substantially as described.

In testimony whereof I affix my signature in presence of two witnesses.

LEONARD SCHADE VAN WESTRUM.

Witnesses:
H. D. JAMESON,
A. NUTTING.